COLOR CODED TELEPHONE CABLE

Filed Dec. 23, 1958 2 Sheets-Sheet 1

By

INVENTOR
W. T. HICKS

W. C. Parnell
ATTORNEY

INVENTOR
W. T. HICKS
BY W. C. Parnell
ATTORNEY

United States Patent Office 3,031,524

Patented Apr. 24, 1962

3,031,524

COLOR CODED TELEPHONE CABLE

William T. Hicks, Glen Rock, N.J., assignor to Western Electric Company, Incorporated, New York, N.Y., a corporation of New York Filed Dec. 23, 1958, Ser. No. 782,538
6 Claims. (Cl. 174—112)

This invention relates to telephone cables and the object of the invention is an improved multi-unit, fully color coded telephone cable.

It is well known in the art that much testing time can be eliminated by color coding telephone wires so that the two ends of a particular wire in a long multi-conductor cable can be identified merely by inspection. The extent to which this and other advantages of color coding can be realized, however, has been limited heretofore by various factors. For economy of manufacture it has been the practice to make unit type cable with a large number of pairs in each unit. Complete color coding of such units requires the use of so many colors that a very costly inventory is required and machine operators and installers find it difficult both to memorize so many color combinations and to distinguish wires of so many colors. Also, some of the commonly used insulating materials are somewhat subject to breakdown unless carefully handled and it therefore has been the practice to provide a percentage of spare pairs in each cable to assure a minimum number of good pairs. As a result, in practice, the number of pairs of the usable wires in cables of different sizes could bear no simple relation to each other and when such cables are connected together in a more or less complex network, there was no convenient way of preserving the pair identity throughout the network so that the two ends of a particular pair could be located quickly by visual inspection.

With the advent of new wire insulating plastics such as polyethylene, insulation failure rarely occurs and the spare pairs of wires are no longer essential. It has been found, however, that when conventional multi-unit cables made from wires insulated with such plastics were subjected to the pressures necessary to deform the cross-sections of the large units sufficiently to make a compact cable, some of the individual wires would cut through their insulation thereby producing faults in the cable.

According to this invention this difficulty is overcome and complete color coding of telephone cables is obtained by making up all cables as multiples of one basic group containing a number of pairs which is small enough to be convenient for color coding purposes. For cables having two groups and for some of the larger sizes, two or more of the groups are each sub-divided into two or more units, all of which have the same group identification. These units are then positioned in the cable in the proper locations with respect to the single unit groups to fill out the cable cross-section and make it possible to produce a round compact cable with only moderate deformation of the unit cross-sections.

In such a cable, however large, any desired pair is uniquely identified by the color of its group binding strand or other group marking and its color coding since there is no duplication of the color code combinations within the units of one group. A telephone subscriber's circuit utilizes two wires of a given pair, one designated "tip" and the other designated "ring." The "tip" is connected to specific components in the circuit while the "ring" is connected to other components. An advantage of the present cable design is that with a relatively small number of pairs within the group, it becomes practicable to assign certain colors exclusively to the "tip" conductors and other colors exclusively to the "ring" conductors so that the identity of the individual wires of a pair also can be visually determined without any ring out test.

These and other features and advantages of the invention will be clearly understood from the following detail description and accompanying drawings in which.

Figure 1:
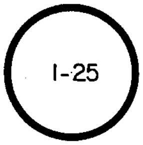
FIG. 1 represents a cable consisting of a single binder group.

In the cable of FIG. 1 the single unit may consist, for example, of 25 twisted pairs of wires in which one conductor for the "ring" side of a telephone circuit is insulated material or marked with material of a color chosen from the group comprising blue (BL) orange (O), green (G), brown (BR) and slate (S) and the other conductor for the "tip" side of the circuit is coded with color chosen from the group white (W), red (R), black (BK), yellow (Y) or violet (V). Hence, full coding of the unit is possible with only ten colors with many resulting advantages as explained below.

Figure 2:
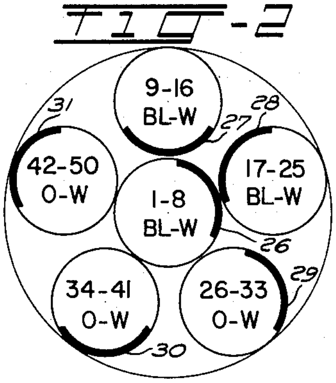
FIGS. 2, 3 and 4 represent a multiple unit group disposition suitable for cables of 2, 3 or 6 binder groups, respectively.

For a 50 pair cable, two units of the type shown in FIG. 1 obviously would have to be subjected to great pressure to compact them into a cable of circular cross-section. On the other hand, if each of the groups is made up in three separate units of 8, 8 and 9 pairs respectively, and all three units of each group are bound with the same color of strand, or otherwise marked to indicate that they form part of the same group, they may be combined as indicated in FIG. 2 to form a cable which can be reduced to substantially circular form with only moderate deformation of the units and hence without destructive effects on the individual wires. In all figures of this drawing a full heavy circle represents a complete binder group and a segmental heavy line represents a unit of a binder group.

It will be noted that the sub-division of the groups into units 26, 27 and 28 (each bound with a blue and white strand) and 29, 30 and 31 respectively (each bound with an orange and white strand) does not in any way interfere with the group color coding nor does it increase the difficulty of finding a particular pair. The coding sequence follows a definite pattern for all binder groups and when the cable is being spliced, for example, the cable splicer merely treats all the units of a group in the same way as a single unit group. The coding sequence may consist, for example, of taking the "ring" colors in sequence with the first "tip" color for pair numbers 1–5 and then with the second "tip" color for pair numbers 6–10, etc. The 25 pairs of the group are accordingly coded as follows:

| Pair Number | Color Code | |
|---|---|---|
| | Tip Conductor | Ring Conductor |
| 1 | W | BL |
| 2 | W | O |
| 3 | W | G |
| 4 | W | BR |
| 5 | W | S |
| 6 | R | BL |
| 7 | R | O |
| 8 | R | G |
| 9 | R | BR |
| 10 | R | S |
| 11 | BK | BL |
| 12 | BK | O |
| 13 | BK | G |
| 14 | BK | BR |
| 15 | BK | S |
| 16 | Y | BL |
| 17 | Y | O |
| 18 | Y | G |
| 19 | Y | BR |
| 20 | Y | S |
| 21 | V | BL |
| 22 | V | O |
| 23 | V | G |
| 24 | V | BR |
| 25 | V | S |

The unit containing pairs 1–8 is quickly identified by noting the presence of white wires, the unit containing pairs 9–16 includes black wires and the unit containing pairs 17–25 includes violet wires. The color coding of the group binding strands follows the sequence used for the pairs. Group 1 is bound with a blue-white strand, group 2 with an orange-white strand, etc., so that the twenty-fourth group of a 600 pair cable has a brown-violet strand. Consequently, by knowing the color code, one can easily correlate the group number with a definite pair in any size cable very quickly. For example, if it is desired to locate pair number 5 in group 2 of a cable, it may be easily identified by locating the slate-white pair in the group having the blue-red strand.

Figure 3:
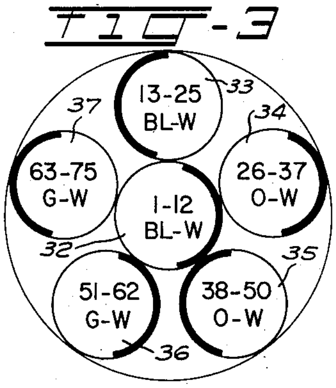
Figure 4:
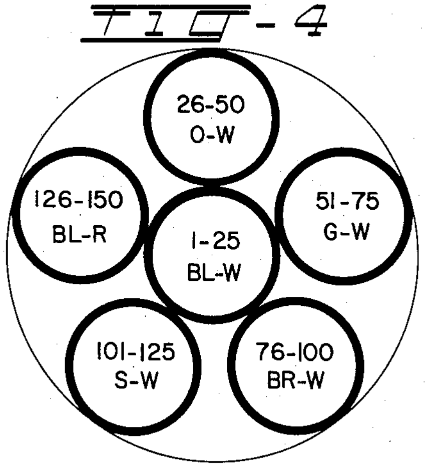

For a 75 pair cable, neither three 25 pair single units nor three three-unit groups produced a satisfactory layup and in this case the six-unit configuration of FIG. 3 can be used by sub-dividing each of the three 25 pair binder groups into two units of 12 and 13 pairs respectively, with the two units of each group carrying the same binder markings. In this case the unit containing the first twelve pairs (32, 34 or 36) is readily identified by the presence of white and red wires and the other units (33, 35 or 37) by the presence of yellow and violet wires. Similarly, the same configuration can be used with advantage for a 150 pair cable merely by cabling together six single unit 25 pair groups as shown in FIG. 4.

Figure 5:
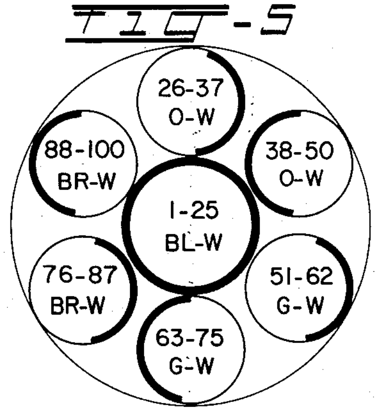
FIGS. 5 and 6 represent dispositions suitable for cables of 4 and 8 binder groups respectively.
Figure 6:
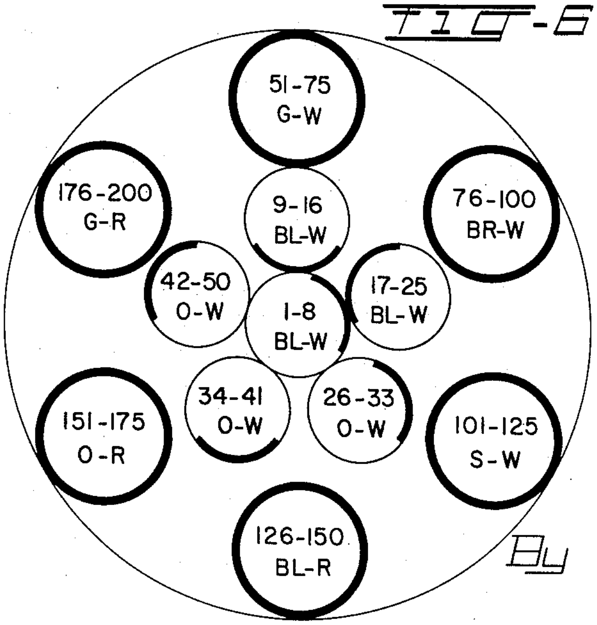
Figure 8:
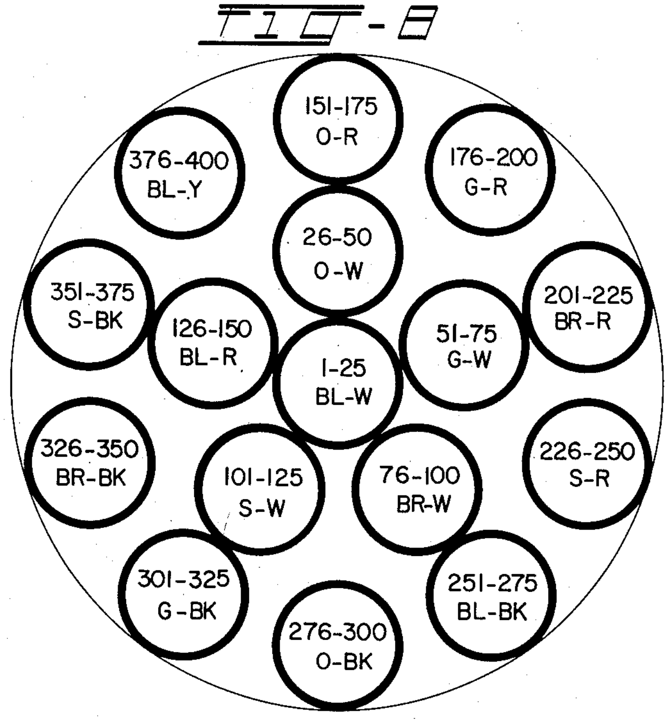
FIG. 8 represents a unit disposition suitable for a cable of 16 groups.
Figure 7:
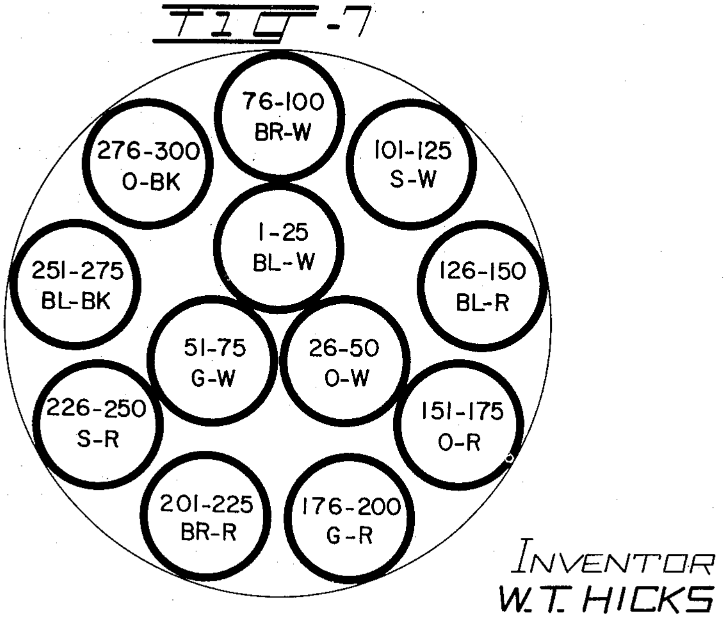
FIG. 7 represents a group disposition suitable for cables of 12 or 24 binder groups.

As indicated in FIG. 5, an approximately circular 100 pair cable is obtained by using a single-unit 25 pair group as a core, and cabling it with three other groups subdivided into 12 and 13 pair units. For a 200 pair cable the 50 pair layup of FIG. 2 may be used as a core and six single unit groups disposed around this core as shown in FIG. 6. An approximately circular arrangement for 300 pair cable is obtained merely by cabling 12 single unit groups as indicated in FIG. 7 and a 600 pair cable may be made in a similar fashion by cabling 12 double cables where each of the twelve cables is a 50 pair cable with the layup shown in FIG. 2. The 400 pair cable of FIG. 8 is formed by cabling ten single unit groups around a 150 pair core of the type shown in FIG. 2. Still larger cables may be formed in similar ways, if desired, so that they will assume a substantially circular cross-section without requiring the application of excessive pressure to the wires.

These electrically reliable cables with their full color coding in units small enough to make it easy to remember the color code greatly simplify the work of the cabling machine operator, cable installer, splicer and tester as well as all the telephone plant service personnel who make telephone line assignments and maintain all the necessary records.

It will be noted that all splicing is done on a strictly color-to-color basis and that even when a circuit extends in sequence through units of cables of different sizes, the identity of each pair is readily maintained in a very simple manner. The restriction of the color code to ten colors also has particular advantages in connection with any punched card control of cable manufacturing processes, inventories, line assignments and other records since only one 10 position row of a standard card is required.

Another very important advantage of these cables resulting from the use of a ten color code is that only ten colors of wire need be stocked for the whole range of cable sizes thereby effecting very large savings in inventory as compared with previous practice.

In setting up the supply stand for making a particular cable this color coding procedure saves a good deal of labor in that each reel position in the supply stand is always loaded with the same color of wire and no shifting of reels between positions is required to condition the stand to make another size of cable. The fact that the larger cables are composed of a large number of units is not a serious disadvantage since machines are now available which can make multi-unit cables from twisted pairs in one operation. One type of machine for this purpose is disclosed in the application of Bryan-Gillis, Serial No. 473,159, filed December 6, 1954, now Patent 2,882,678.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A color coded cable comprising a plurality of distinctly marked binder groups, each group having a like number of coded pairs of conductors insulated with readily deformable material, the pairs of conductors being distinctly identifiable within a group and coded similar to the pairs of conductors in the other groups, at least two of the groups being subdivided into a plurality of units each bearing the distinctive group binder, and the units of the subdivided groups being distributed to produce a cable of compact, essentially circular cross section.

2. A color coded cable comprising a plurality of groups each having the same number of pairs of insulated telephone wires, each pair comprising a tip and a ring conductor, each group being completely coded with a distinctive colored binder for visual identification of any pair in the group and of either conductor of the pair, the groups being subdivided and bound into a number of units at least equal to the number of groups, the units being coded with the same colored group binder from which they are subdivided for visual group identification and being sufficient in number to form a cable of compact, essentially circular cross-section.

3. A cable according to claim 2 including 50 pairs of conductors in two identical groups, each group comprising three units having respectively 8, 8 and 9 differently color coded pairs.

4. A cable according to claim 2 including at least three identical groups each comprising two units having respectively 12 and 13 differently color coded pairs.

5. A cable according to claim 2 comprising two groups each bound in three units together forming a substantially circular core and six groups each bound as a single unit forming an outer layer around the core.

6. A cable comprising three groups according to claim 2 together forming a core and nine other groups according to claim 2 forming an outer layer around the core.

References Cited in the file of this patent

UNITED STATES PATENTS

| | | |
|---|---|---|
| 1,667,824 | Richey | May 1, 1928 |
| 1,727,971 | Ford | Sept. 10, 1929 |
| 1,727,972 | Ford | Sept. 10, 1929 |
| 1,856,676 | Weston | May 3, 1932 |
| 1,950,126 | Staples | Mar. 6, 1934 |
| 2,106,048 | Candy | Jan. 18, 1938 |

OTHER REFERENCES

Publication I: "REA Specification for Fully Color-Coded Polyethylene-Insulated, Polyethylene-Jacketed Telephone Cables, PE–22," January 1958.

UNITED STATES PATENT OFFICE
CERTIFICATE OF CORRECTION

Patent No. 3,031,524 April 24, 1962

William T. Hicks

It is hereby certified that error appears in the above numbered patent requiring correction and that the said Letters Patent should read as corrected below.

Column 3, line 43, for "blue-red" read -- orange-white --.

Signed and sealed this 13th day of November 1962.

(SEAL)
Attest:

ERNEST W. SWIDER
Attesting Officer

DAVID L. LADD
Commissioner of Patents